United States Patent
Prestigiacomo et al.

(10) Patent No.: US 10,678,469 B2
(45) Date of Patent: *Jun. 9, 2020

(54) METHOD TO INTELLIGENTLY MONITOR, DETECT AND DISPLAY SIMULTANEOUS INDEPENDENT VIDEOS ON A DISPLAY

(71) Applicant: ARRIS Enterprises LLC, Suwanee, GA (US)

(72) Inventors: Robert Prestigiacomo, North Wales, PA (US); Krishna Prasad Panje, Bangalore (IN); Aniela Rosenberger, Norristown, PA (US); Dinkar N. Bhat, Princeton, NJ (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/053,778

(22) Filed: Aug. 2, 2018

(65) Prior Publication Data
US 2019/0196717 A1 Jun. 27, 2019

Related U.S. Application Data

(63) Continuation of application No. 15/835,202, filed on Dec. 7, 2017.

(51) Int. Cl.
*H04N 5/45* (2011.01)
*H04N 5/445* (2011.01)
(Continued)

(52) U.S. Cl.
CPC ............ *G06F 3/065* (2013.01); *G06F 3/0604* (2013.01); *G06F 3/067* (2013.01); *G06F 3/0617* (2013.01);
(Continued)

(58) Field of Classification Search
CPC .......... H04N 21/4621; H04N 21/4316; H04N 21/44213; H04N 5/45; H04N 5/445
(Continued)

(56) References Cited

U.S. PATENT DOCUMENTS 9,043,850 B2 * 5/2015 Hoffert .............. H04N 5/44591
725/43
9,183,560 B2 * 11/2015 Abelow ............... G06Q 10/067

* cited by examiner

*Primary Examiner* — Sherrie Hsia
(74) *Attorney, Agent, or Firm* — Wenderoth, Lind & Ponack, L.L.P.

(57) ABSTRACT

Methods, systems, and computer readable media are implemented by a decoder associated with a STB to facilitate intelligent monitoring, detecting and displaying simultaneous independent videos on a display. A request is initiated to display a PiP window that presents a second content stream simultaneously with a first content stream. The request includes information as to input parameters and video input characteristics for each of the first and second content streams. Currently available resources, including memory and bandwidth, are monitored and upon initiation of the PiP window request a query is executed to determine if the available resources are sufficient. If yes, allocation of available resources is carried out to simultaneously display the first and second content streams. If no, an adjustment operation is carried out that modifies at least one input parameter or video input characteristic to simultaneously display content streams in optimal formats. User preferences may be considered for viewer consistency.

20 Claims, 8 Drawing Sheets

(51) Int. Cl.
*G06F 3/06* (2006.01)
*G06F 9/455* (2018.01)
*G06F 11/07* (2006.01)

(52) U.S. Cl.
CPC .......... *G06F 3/0631* (2013.01); *G06F 3/0644* (2013.01); *G06F 3/0664* (2013.01); *G06F 3/0689* (2013.01); *G06F 9/45533* (2013.01); *G06F 11/0709* (2013.01); *G06F 11/0727* (2013.01); *G06F 11/0751* (2013.01); *G06F 11/0793* (2013.01); *G06F 2009/45583* (2013.01)

(58) Field of Classification Search
USPC ....... 348/563–567, 569; 725/40, 41, 43, 110
See application file for complete search history.

METHOD TO INTELLIGENTLY MONITOR, DETECT AND DISPLAY SIMULTANEOUS INDEPENDENT VIDEOS ON A DISPLAY

FIELD OF THE INVENTION

This application is a continuation of U.S. patent application Ser. No. 15/853,202, entitled "Method To Intelligently Monitor, Detect And Display Simultaneous Independent Videos On A Display", filed on Dec. 7, 2017, (now U.S. Pat. No. 10,070,186). This disclosure relates to a video decoder; and, more particularly, to a method and apparatus, including digital set-top boxes (STBs), implementing decoders that are capable of intelligently monitoring, detecting and displaying simultaneous independent videos on a display.

DESCRIPTION OF THE PRIOR ART

Resource constrained set-top boxes (STBs) which do not have dual high definition (HD) decoders are challenged when handling simultaneous video feeds to support functionalities, such as picture-in-picture (PiP). With PiP, one program channel is displayed on a full TV screen simultaneously with at least one other program channel. The other program channel is displayed in a viewable inset window having sound from the main program and an ability to readily swap screens. Typically, PiP functionality requires two independent tuners or signal sources to display the large screen and the small inset screen program channels. Dual-tuner PiP TVs have a built in second tuner, but single-tuner PiP TVs require an external signal source, which may be an external tuner, DVD player, or a STB. However, STBs lacking dual HD decoders do not support the PiP functions, and leave the end user/viewer without PiP viewing capability.

Additionally, problems in PiP occur during delivery of quality picture when more than one feed is configured for HD, and/or concerning feeds coming from various inputs including Data Over Cable Service Interface Specification (DOCSIS), Quadrature amplitude modulation (QAM) or Internet Protocol (IP). Furthermore, the video on each feed may be delivered in different codecs (MPEG2, MPEG4, and the like). DOCSIS is an international telecommunications standard employed by many cable television operators to provide Internet access over existing hybrid fiber-coaxial (HFC) to permit the addition of high-bandwidth data transfer to an existing cable TV (CATV). QAM is both an analog and a digital modulation scheme conveying two analog message signals, or two digital bit streams. Transcoding, the direct analog-to-analog or digital-to-digital conversion of one encoding to another, is usually carried out in cases where a target device (or workflow) does not support the format or has limited storage capacity requiring reduced file size, or to convert incompatible or obsolete data to a newer format. Often current PiP protocols fail to perform PiP operations in view of user preferences, once again sacrificing the viewing quality.

Prior solutions simply use available resources and display surfaces to display multiple videos, but fail to provide user choice and application involvement to handle multiple video, STB resources and single display for quality viewer presentation. Some solutions attempt to utilize separate components, such as splitters, to deliver two different connections to the TV having built-in PiP support. Even with the use of splitters and the like, several limited STBs still cannot deliver PiP functionality. Unfortunately, the proposed solutions fail to provide user choice and applications to handle multiple videos, STB resources and single display in a manner that does not compromise the end user's viewing quality or selections. Solutions in the art have failed to provide the ability for limit resource STBs to handle multiple inputs and presentations.

Accordingly, there exists a need in the art for improved methods and systems that intelligently manage multiple video decoder presentations in resource limited environments. Also needed in the art are methods and systems that take into consideration user preferences and execute applications operable to manage multiple videos, STB resources and single display in a manner that does not compromise the end user's viewing quality or selections.

SUMMARY OF THE INVENTION

The present invention provides methods, systems, and computer readable media operable to execute multiple inputs and presentations implemented in resource limited environments, particularly STBs or set top units (STUs), through intelligent applications and algorithms. Use of the disclosed methods, systems, and computer readable media described herein allows intelligent management of multiple video decoder presentations in resource limited environments while taking into consideration user preferences to execute applications operable to manage multiple videos, STB resources and single display in a manner that does not compromise the end user's viewing quality or selections. Advantageously, the subject methods, systems, and computer readable media are operable with existing STBs without the need to add any additional hardware cost to the end user.

In a first aspect of the invention there is provided a method for intelligently monitoring, detecting and displaying simultaneous independent videos on a display. The method comprises the step of receiving a request to display a PiP window presenting a second content stream simultaneously with a first content stream on the display, said first and second content streams each have input parameters and video input characteristics. The method also includes the step of monitoring currently available resources including memory and bandwidth, and: i) if available resources are sufficient, allocating available resources to simultaneously display the first and second content streams; and ii) if available resources are not sufficient, an adjustment operation is carried out modifying at least one of the input parameters or video input characteristics to simultaneously display the first and second content streams.

In another aspect of the invention, there is provided a decoding apparatus associated with a STB for intelligently monitoring, detecting and displaying simultaneous independent videos on a display. The apparatus includes at least one decoder for decoding programs in an encoded format having at least one input that receives at least one encoded program, wherein the decoder decodes the encoded program to yield a first content stream, and at least one output that outputs the first content stream on a display. The apparatus also includes a processer configured to: (i) initiate a request to display a PiP window presenting a second content stream simultaneously with the first content stream on the display, said first and second content streams each having input parameters and video input characteristics; (ii) monitoring currently available resources including memory and bandwidth: if available resources are sufficient, allocating available resources to simultaneously display the first and second content streams, if available resources are not sufficient, carrying out an adjustment operation that modifies at least one of the input parameters or video input characteristics to simultaneously display the first and second content streams.

In another aspect of the invention there is provided one or more non-transitory computer readable media having instructions operable to cause one or more processors to perform the operations. The non-transitory computer readable media comprises: receiving a request to display a PiP window presenting a second content stream simultaneously with a first content stream on the display, said first and second content streams each having input parameters and video input characteristics; monitoring currently available resources including memory and bandwidth: if available resources are sufficient, allocating available resources to simultaneously display the first and second content streams; if available resources are not sufficient, an adjustment operation is carried out that modifies at least one of the input parameters or video input characteristics to simultaneously display the first and second content streams.

BRIEF DESCRIPTION OF THE DRAWINGS

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
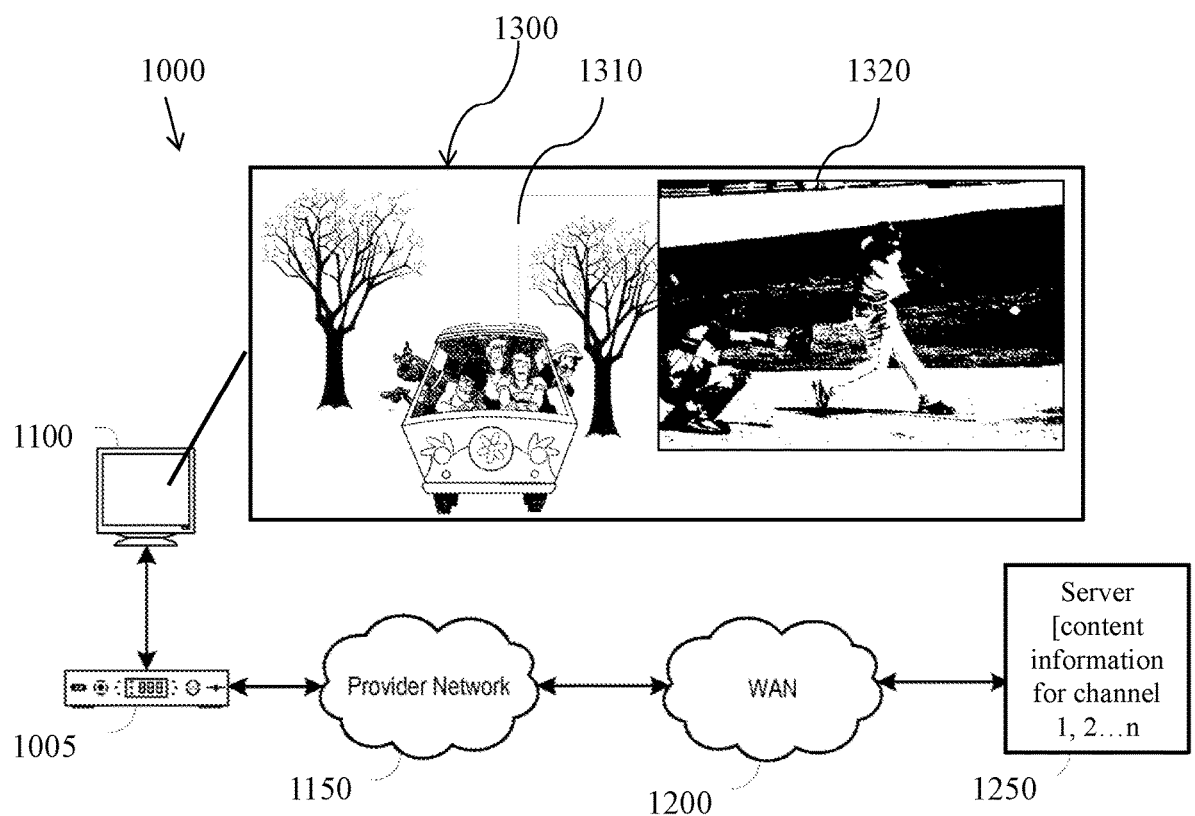
FIG. 1 is a block diagram illustrating an example network environment operable to facilitate a PiP window presenting, on a display, a second content stream simultaneously with a first content stream, operable through an STB.

The subject invention enables resource constrained STBs lacking dual HD decoders to execute simultaneous video feed operations through implementation of intelligent decisions on how to manage multiple video decoder presentations. An intelligent algorithm is carried out by the subject method and apparatus that monitors the resources available on the STB and accordingly determines how the presentations of the different video inputs have to be processed. The input to the algorithm includes the parameters for each video presentation (including size, location) and video input characteristics (resolution, frame rate and aspect ratio). The output of the algorithm includes the optimal presentation parameters based on STB load and current resource (for example, decoder type) available.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

In an embodiment of the present invention, an integrated decoder can simply be updated through software upgrade to the subject platform software to perform with the application and execute the subject algorithm to provide PiP functionality. Alternatively, an expansion option for an existing set-top box is provided by using an external decoding apparatus with the subject platform software to perform with the application and execute the subject algorithm for PiP functionality.

A decoding apparatus decodes content of a program that is encoded based on different encoding standards. The subject decoding apparatus allows a set-top box to support different encoding standards (or higher data rates of a standard) taking into consideration adjustment parameters and user preferences. Generally, a set-top box is a device that connects to an external device and an external source of a signal. Typically, the external device is an end user device, such as a TV or a computer monitor. The set-top box receives encoded content/input format in transport streams and decodes the content for viewing at the end user device, such as a TV connected to the set-top box. Examples of set-top boxes are a cable set-top box or an Internet Protocol (IP) set-top box. Content may include video, audio, Internet web pages, interactive games, or other data.

In one aspect of the invention, the input format may be decodable by only one decoder in the STB and at that time preferably the STB (or application) suitably reconfigures or indicates unavailability to present (either video or graphics) accordingly. In another scenario, depending upon the format of incoming media data, the STB (or application) suitably selects/configures the decoders so that both windows are filled with video without any blank spaces (multi format handling).

More than one feed may be presented as HD and the feeds could come from various inputs including DOCSIS, QAM or IP. Furthermore, the video on each feed could be delivered in different codecs (MPEG2, MPEG4, and the like). Implementation of the subject invention not only provides the ability for resource-constrained STBs to run simultaneous feeds, but it also enables the best possible experience to the viewer in terms of usability where the user can switch between different presentations very smoothly. Preferably, the subject system and method allows the viewer/user to give priority to either guide display or video display.

Many factors are considered by the subject system and method, including but not limited to, display position, location, size, presentation layer and resolution to determine the best possible presentation for the end user. For instance, depending on system loading, it may be necessary to "fine tune" these factors to accomplish the best presentation. In case of PiP, it may be more advantageous to "hide shrink scale manipulate" a decoder's presentation path. The subject application is capable of pre-configuring the decoder with inputs from numerous paths such as (IP Video, DOCSIS, QAM) and adapting the source video in preparation for primary display. By hiding the preloaded decoder behind the primary, the subject system and method can more efficiently switch between presentations. For cases of PIP, it may be advantageous to shrink scale the size of the background presentation to conserve resources to allow full HD display on the primary surface. In one embodiment, the video parameters are supplied to the application and application can engage decoders and display accordingly (user can give priority to guide display over video or vice versa). As a result, the subject system and method provides a graceful handling of decoding/display resources.

In a first embodiment, the subject platform and executed application resource considerations are (i) available Memory and (ii) Real-time system bandwidth. Platform operability of the subject application is initiated when a viewer/user requests to present a PiP window in conjunction with a current presenting video window (main display). The STB platform software considers if enough memory and system bandwidth is available to service the request for the PiP display. If resources are not sufficient, the platform will consider the configuration of the requested PiP display and "adjust" so as to allow the request to be honored.

"Adjustment" can include (but is not limited to): (1) re-sizing the requested PiP display so as to conserve resources while not jeopardizing the presentation to end user (by resizing, the memory and system bandwidth is reduced); and/or (2) reducing graphics resolution to free additional memory, while not jeopardizing the look and feel of the product. The above adjustment is made, depending upon user preference for Video or graphics resolution and present platform capability, stream resolution and bandwidth. By applying the adjustment with known bias (Video/graphics), the presentation is consistent for the user.

For example, as in a case wherein a user requests a PiP display of full HD size and resolution, the subject platform analyzes the configuration and determines if resources are present that are insufficient to honor the request. The platform then strategically "adjusts" the display to meet the needs of the system, allowing the request to complete at an "optimal" presentation. Adjustment of the "display" can be any of the following (but not limited to), graphics size resolution, and/or video display size resolution. When the above adjustment is made, user preference can also be taken into account; so that experience is consistent (i.e. video is always HD for one user).

In one embodiment, the video parameters are supplied to the application and application can engage decoders and display accordingly. This would lead to a graceful handling of decoding/display resources. For example, the application can partition the memory/decoding or display area between video and application graphics.

Resources to consider in operation of the application and platform include memory, decoder and display area. Thereupon, the application will execute allocation of these resources based on first come first served. For example, if video priority is set to HD, based on the incoming video parameters (passed to application), the application can allocate Memory and Decoder (HD) for video and degrade the graphics video. The video can occupy HD resolution and graphics video SD resolution in a case where both have to be presented.

In another embodiment, the STB application or platform can stretch/scale the video/app graphics to accommodate the available memory/decoder resource and user preference. For example, if both incoming Videos are HD, if only one HD surface is possible, then the STB application software can scale and position both videos to consume one HD surface but occupy the full display.

In another embodiment, the subject platform and executed application resource considerations are (i) available Memory, (ii) decoder and (iii) display area. Platform operability of the subject application is initiated when PiP is requested. The application and/or platform software will try to allocate HD surface/decode for both videos and may fail or only one surface may occasionally be needed. In order to address this issue, the subject platform software uses SD or decodes to SD (both videos) and scale and presents the video.

STBs are discussed broadly herein; however the subject system and methods are applicable to other types of apparatuses, set top units, or information appliance devices that generally contain a TV-tuner input and displays output to a television set and an external source of signal, turning the source signal into content in a form that can then be displayed on the television screen or other display device. While the subject discussion describes operation of the subject platform software in conjunction with PiP, it is to be understood that other advanced functionalities are contemplated. Because the subject system and method does not require hardware modification of the STB or information appliance devices, pre-existing set-up client STBs do not require recall or redistribution. Existing client STBs are capable of being updated with the appropriate software to execute the system and method for the existing client accounts to provide PiP functionality in an optimal format.

Methods, systems, and computer readable media operable to facilitate the initiation of the platform software application in performing the PiP function. An initial setup process may be implemented wherein the user enters user preferences. The method may further comprise the steps of re-initiating the user preferences at a later time.

A multiple systems operator (MSO) provider/content provider transmits a plurality of program transport content streams to a STB. Program transport streams include any audio or video data or information, such as streamed audio services, streamed video services, and streamed data services or files. As also referenced herein, a user/viewer/end user is an individual, a group of individuals, a company, a corporation, or any other entity that purchases, subscribes, or is authorized otherwise to receive access to one or more particular content services. Examples of users/viewers/end users include but are not limited to CATV subscribers, satellite TV subscribers, satellite radio subscribers, IPTV subscribers, and Pay-Per-View (PPV) purchasers of PPV events. As also referenced herein, a PPV event is a particular content program for which a user is charged to view. As further referenced herein, an end user device is that device used to access content provided by a service provider (or content provider), which content the user has authorization to access. Examples of end user devices include, but are not limited to CATV, satellite-TV, personal computer, mobile handsets, and portable media players. It should be noted that a device is operable as either a stand-alone unit (e.g., a digital screen and a computer monitor) or an integral part of a content-viewing device, such as a television with a built-in CATV receiver.

Different program transport streams may be encoded based on different encoding standards. The different encoding standards for digital audio and video file may include different Motion Picture Expert Group (MPEG) standards, such as MPEG2 and MPEG4 standards. The different encoding standards for digital audio file may include, MP3, Advanced Audio Coding (AAC) and Dolby® Digital Plus (DDP). Once the program transport streams are transmitted, the STB decoder may decode each of the plurality of program transport streams so that the end user device may display the content.

FIG. 1 is a block diagram illustrating an example network environment 1000 operable to facilitate a PiP window presenting a second content stream simultaneously with a first content stream on the display operable through an STB. In embodiments, a set-top box (STB) 1005 may receive data and/or video services at a subscriber premise, and may output received multimedia content to a display device 1100 (e.g., television). Content may be delivered to the STB 1005 over one or more channels through a provider network 1150 (e.g., hybrid fiber-coaxial network, fiber network, cellular network, high speed data network, etc.). Content may be provided by a wide-area network (WAN) 1200, and a headend device may format and package the content for delivery over the provider network 1150. For example, content (e.g., real-time content, linear, Internet) associated with a channel may be delivered to the STB 1005 over a specific frequency and/or wavelength/Internet protocol associated with the channel.

The STB 1005 may consult a program map table (PMT) to identify specific content information received by the STB 1005 as a multimedia stream, along with input parameters and video input characteristics for content streams downloaded from one or more servers 1250. For example, a tuner at the STB 1005 may be tuned to a specific channel, channel 1, based upon a channel selection made at the STB 1005 by a user. The tuner may identify and prepare for processing multimedia content associated with channel 1. Upon a request for a PiP to display a channel 2 on the display screen 1300, content information for channel 2 is downloaded for the second identified channel. Herein, the STB 1005 is processing multimedia content downloaded from an EPG 130 viewable by a user on display 1100. A tuner at the STB 1005 may be used to allow a user to change content received and output for display by the STB 1005.

In embodiments, the STB 1005 parses and partitions channel 1 and channel 2, content information in order to establish the requested PiP request. Upon initiation of the PiP request, the STB 1005 platform executes a query to determine if there is sufficient memory and system bandwidth available, if yes, the PiP is displayed on the display screen 1300, displaying channel 1 at 1310 and channel 2 at 1320. Resources are allocated to simultaneously display the first and second content streams and the PiP is displayed, channel 1 at 1310 and channel 2 at 1320. If available resources are not sufficient the STB platform performs an adjustment operation that modifies at least one of the input parameters or video input characteristics of channel 1 and/or channel 2 to simultaneously display the first and second content streams, and the PiP is displayed on display screen 1300.

Figure 2:
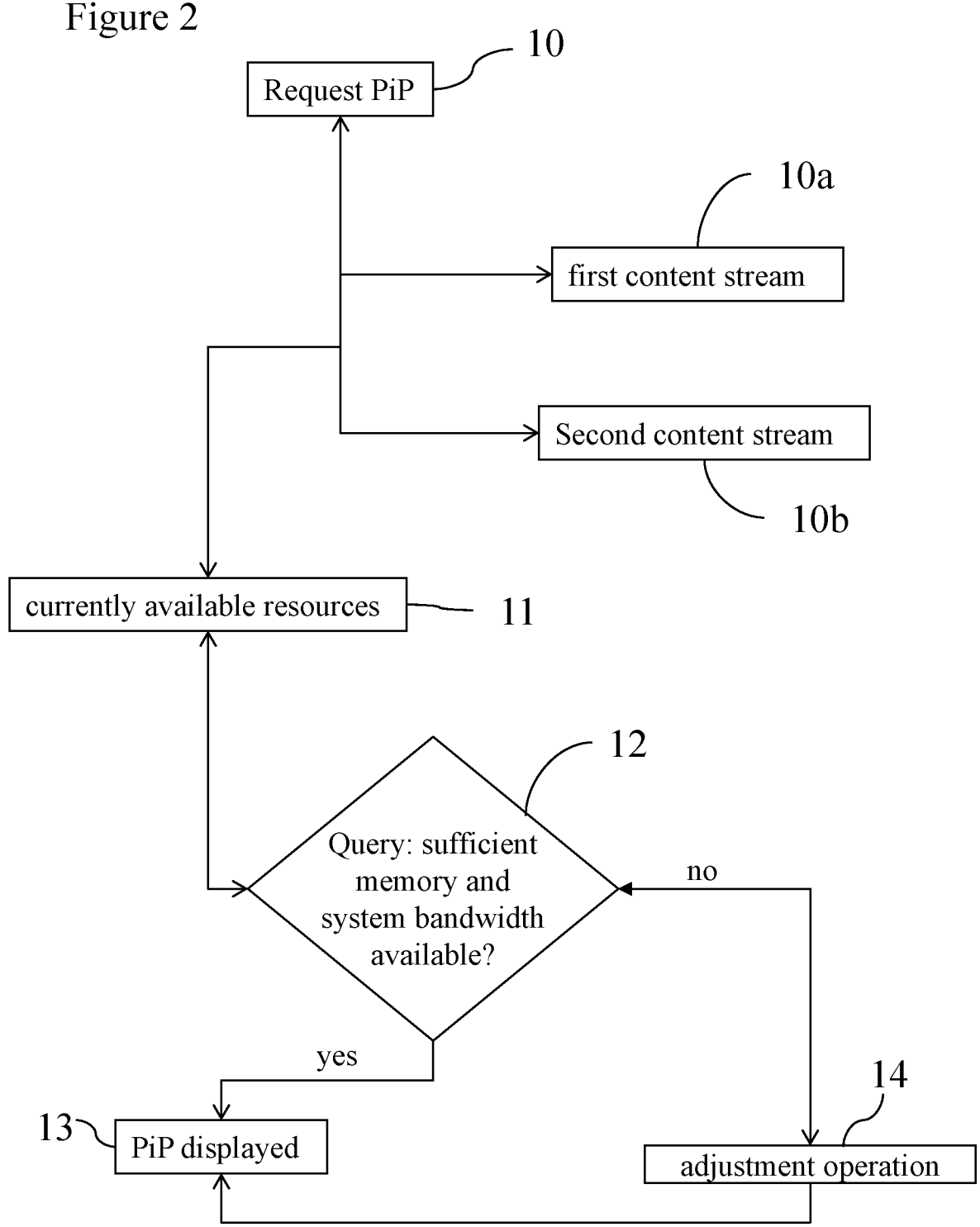
FIG. 2 is a flowchart illustrating steps of an embodiment of the subject algorithm.

FIG. 2 is a flowchart illustrating steps of an embodiment of the subject algorithm. Note the steps may be rearranged in a different order. In step 10, the system receives a request to display a PiP window presenting a second content stream simultaneously with a first content stream on the display. Content information provided includes input parameters and video input characteristics for each of the first and second content streams, shown at step 10*a* and 10*b*, respectively. In step 11 the system monitors currently available resources, including system memory and bandwidth. Upon initiation of step 10, the PiP request, in step 12 a Query is run determining if there is sufficient memory and system bandwidth available? If "yes" available resources are sufficient, and at step 13 the resources are allocated to simultaneously display the first and second content streams and the PiP is displayed. If "no" available resources are not sufficient, and at step 14, an adjustment operation is carried out that modifies at least one of the input parameters or video input characteristics to simultaneously display the first and second content streams, and the PiP is displayed at 13.

Preferably the second content stream's input parameters and video input characteristics undergo the adjustment operation prior to adjustment to the first content stream's input. If further resources are available, then adjustment operations are then carried out as to first content stream. If the PiP screen is swapped with the main screen, the first content stream is then swapped into the PiP window and the second content stream in the main display. In which case, the method can readjust the parameters and characteristics of each so that the main display content stream is superior to the PiP window.

Optionally, both the first and second content stream's input parameters and video input characteristics undergo the adjustment operation. Preferably, the input parameters include display size and display location and the input characteristics include graphics resolution, frame rate and aspect ratio. User preferences including known bias (video or graphics resolution) may be considered, so that the adjustment operation is carried out consistent with the user preferences. Additionally, adjustment operation can further be carried out to modify the system platform, including present platform capability, stream resolution, bandwidth, memory, decoders and display area. Alternatively, the adjustment operation comprises partition of the memory, decoding and adjusting display area between the PiP window's video and graphics. The adjustment operation may comprise stretch/scale of the PiP window video/app graphics to accommodate available memory, adjusting decoder resources and user preferences.

Figure 3:
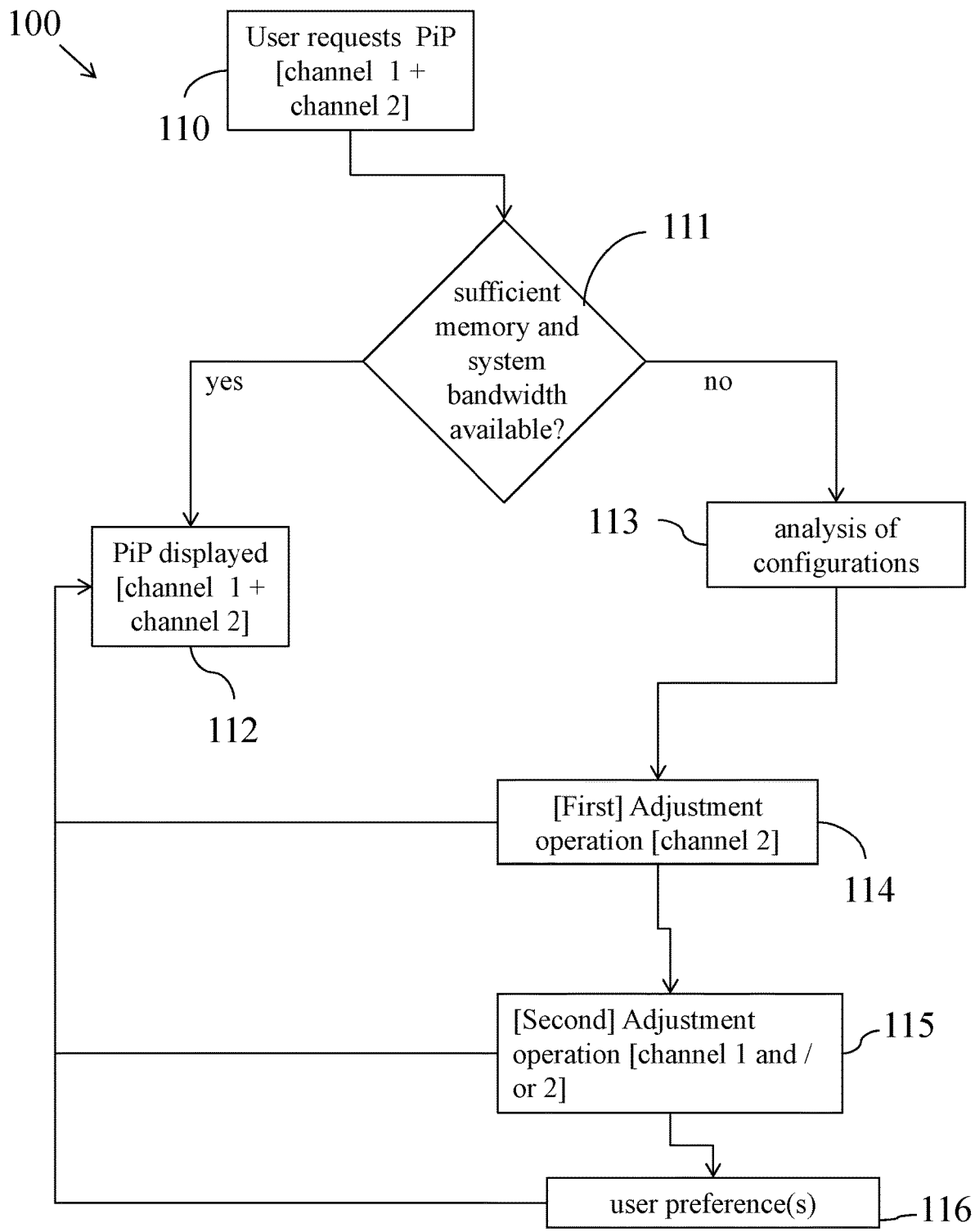
FIG. 3 is a flowchart illustrating steps of another embodiment of the subject algorithm.

FIG. 3 is a flowchart, shown generally at 100, illustrating steps of the subject method and apparatus algorithm wherein resources considered are available Memory and Real-time system bandwidth. In this flowchart, for example the user requests a PiP display of full HD size and resolution. Data stream managers and related functionality can be implemented in hardware and/or software. The data stream manager transmits content from a first content stream (i.e. data received on channel 1) in an outputted data stream to a user. In step 110, the user requests a PiP window, thereby initiating a command to the data stream manager to present a second content stream (i.e. data received on channel 2) simultaneously with the current presenting video window (main display) displaying the first content stream, channel 1.

In response to receiving a command for PiP, in step 111 the STB platform software determines if there is sufficient memory and system bandwidth available to service the request for the PiP display.

If resources are sufficient, in step 112 the data stream manager initiates transmission of content from the second content stream, channel 2, and the decoder to stream channel 2, showing channel 2 in a PiP displayed in an inset picture on the main display screen displaying channel 1.

If resources are not sufficient, in step 113 the platform initiates an analysis of the configuration of the requested PiP display and an adjustment operation is initiated based on adjustment parameters. Adjustment parameters include User preferences (known bias, i.e. video or graphics resolution), present platform capability, stream resolution and bandwidth.

In step 114 the platform performs a first adjustment operation, re-sizing the requested PiP display, i.e. channel 2, based on the adjustment parameters to conserve resources while not jeopardizing the presentation to end user via memory and system bandwidth reduced by applying known bias (video/graphics).

In step 115, the platform performs a second adjustment operation, reducing graphics resolution for the picture of channel 1, 2 or both to free additional memory. This is executed without jeopardizing the look and feel of the product by applying a known bias (video/graphics) to display channel 2 in the PiP inset display simultaneously with channel 1 in the main display.

Optionally, in step 116, user preference(s) can also be taken into account, so that experience is consistent (i.e. video is always HD for one user).

Figure 4:
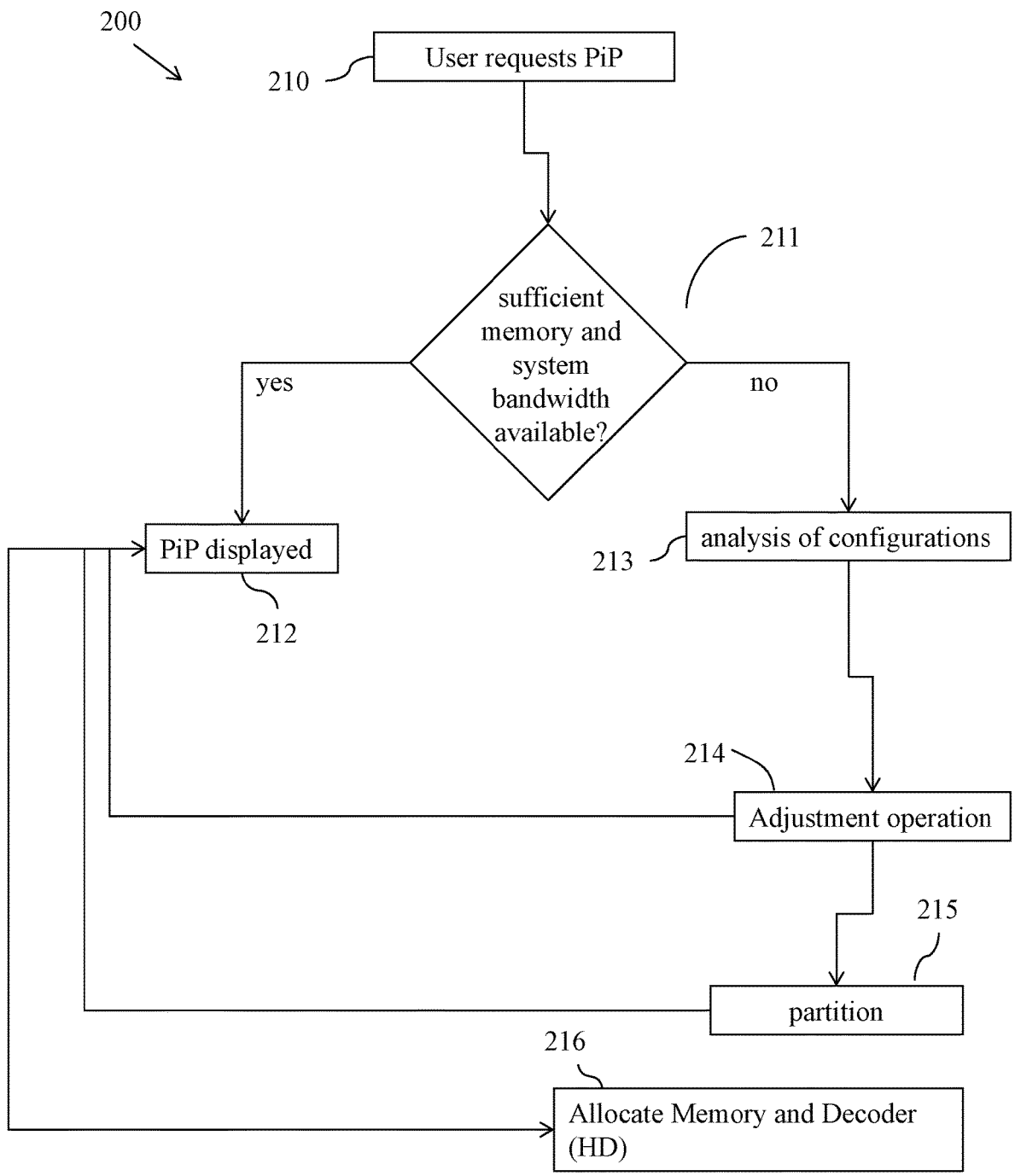
FIG. 4 is a flowchart illustrating steps of another embodiment of the subject method and apparatus algorithm.

FIG. 4 is a flowchart, shown generally at 200, illustrating steps of another embodiment of the subject method and apparatus algorithm wherein resources considered are available Memory and Real-time system bandwidth. Data stream managers and related functionality can be implemented in hardware and/or software. The data stream manager transmits content from a first content stream (i.e. data received on channel 1) in an outputted data stream to a user. In step 210, the user requests a PiP window, thereby initiating a command to the data stream manager to present a second content stream (i.e. data received on channel 2) simultaneously with the current presenting video window (main display) displaying the first content stream, channel 1.

In response to receiving a command for PiP, in step 211 the STB platform software determines if there is sufficient memory and system bandwidth available to service the request for the PiP display based on video parameters or configurations supplied to the application. If yes, at step 212 the data stream manager initiates transmission of content from the second content stream, channel 2, and the decoder to stream channel 2 in a PiP displayed in an inset picture on the main display screen displaying channel 1.

If resources are not sufficient, in step 213 the platform initiates an analysis of the configuration of the requested PiP display and an adjustment operation is initiated based on adjustment parameters.

In step 214 the platform performs an adjustment operation, engaging decoders and the display based on the adjustment parameters, including (i) user preferences (known bias, i.e. video or graphics resolution), (ii) present platform capability, (iii) stream resolution, (iv) bandwidth, (v) memory, (vi) decoder and (vii) display area. In step 215 the memory, decoder and display area are partitioned.

Based on the incoming video parameters (passed to application or platform), the application allocates memory and decoder (HD) for video and degrades the graphics video at step 216. The video for channel 1 of main display, channel 2 of the PiP inset display, or both channel 1 and 2, can occupy HD video resolution and SD graphics resolution in a case where both have to be presented.

Figure 5:
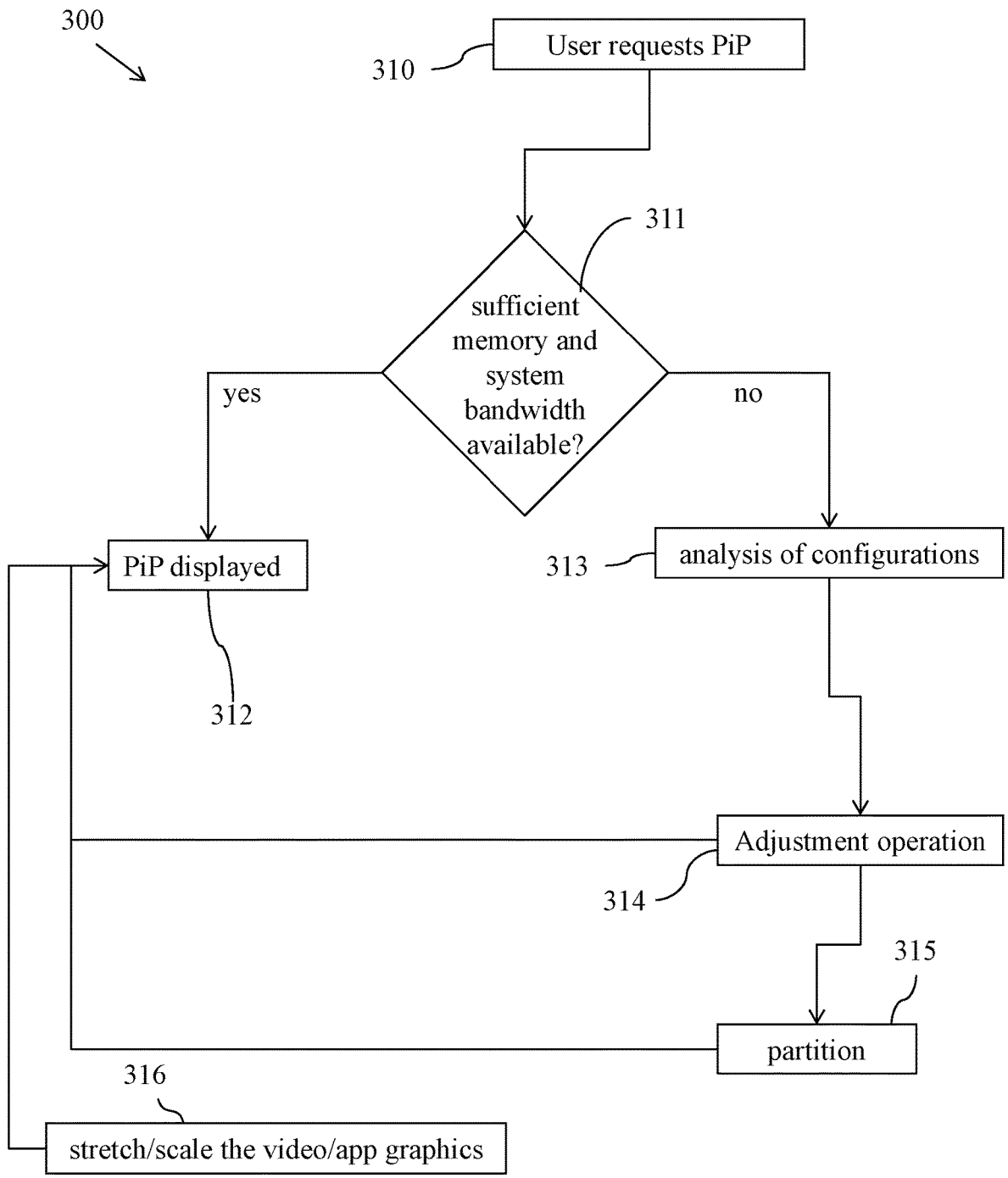
FIG. 5 is a flowchart illustrating steps of another embodiment of the subject method and apparatus algorithm.

FIG. 5 is a flowchart, shown generally at 300, illustrating steps of another embodiment of the subject method and apparatus algorithm. Data stream managers and related functionality can be implemented in hardware and/or software. The data stream manager transmits content from a first content stream (i.e. data received on channel 1) in an outputted data stream to a user. In step 310, the user requests a PiP window, thereby initiating a command to the data stream manager to present a second content stream (i.e. data received on channel 2) simultaneously with the current presenting video window (main display) displaying the first content stream, channel 1.

In response to receiving a command for PiP, in step 311 the STB platform software determines if there is sufficient memory and system bandwidth available to service the request for the PiP display based on video parameters or configurations supplied to the application. If yes, at step 312 the data stream manager initiates transmission of content from the second content stream, channel 2, and the decoder to stream channel 2 in a PiP displayed in an inset picture on the main display screen displaying channel 1.

If resources are not sufficient, in step 313 the platform initiates analysis of configuration of the requested PiP display and an adjustment operation is initiated based on adjustment parameters.

In step 314 the platform performs an adjustment operation, engaging decoders and the display based on the adjustment parameters, including (i) user preferences (known bias, i.e. video or graphics resolution), (ii) present platform capability, (iii) stream resolution, (iv) bandwidth, (v) memory, (vi) decoder and (vii) display area. In step 315 the memory, decoder and display area are partitioned.

Based on the incoming video parameters (passed to application or platform), the application can stretch/scale the video/app graphics to accommodate the available memory/decoder resource and user preference via the use of SD or decode to SD (both videos) and scale and present the video of channel 1 and 2 (channel 1 in of main display, channel 2 of the PiP inset display), at step 316.

Figure 6:
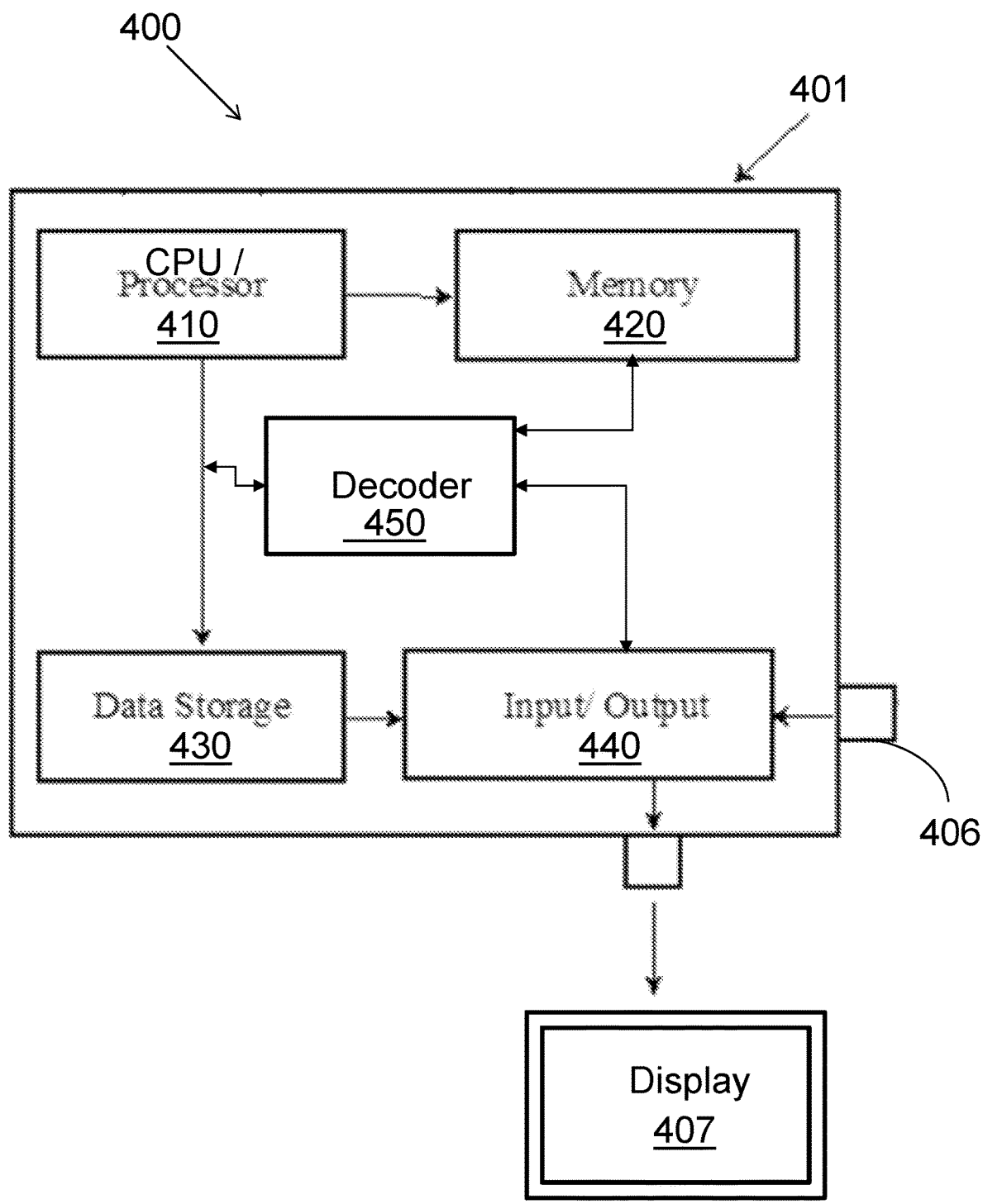
FIG. 6 is an architecture diagram of elements of a STB operable with the subject invention.

FIG. 6 is an architecture diagram of elements of a STB operable with the subject invention, shown generally at 400. STB 401 is shown as a source device or apparatus for implementation of the subject invention. The STB 401 includes hardware generally configured having a module including a CPU/processor 410, a decoder 450, a memory 420, a storage device 430, and an input/output device 440. Each of the components 410, 450, 420, 430, and 440 can, for example, be interconnected using a system bus. The processor 410 can be capable of processing instructions for execution of the subject method, system and computer readable media within the hardware configuration 400. STB 401 includes network connection to a service provider 406. STB 401 is connected through a high-definition multimedia interface (HDMI) 407 to a display device, herein a television.

Figure 7:
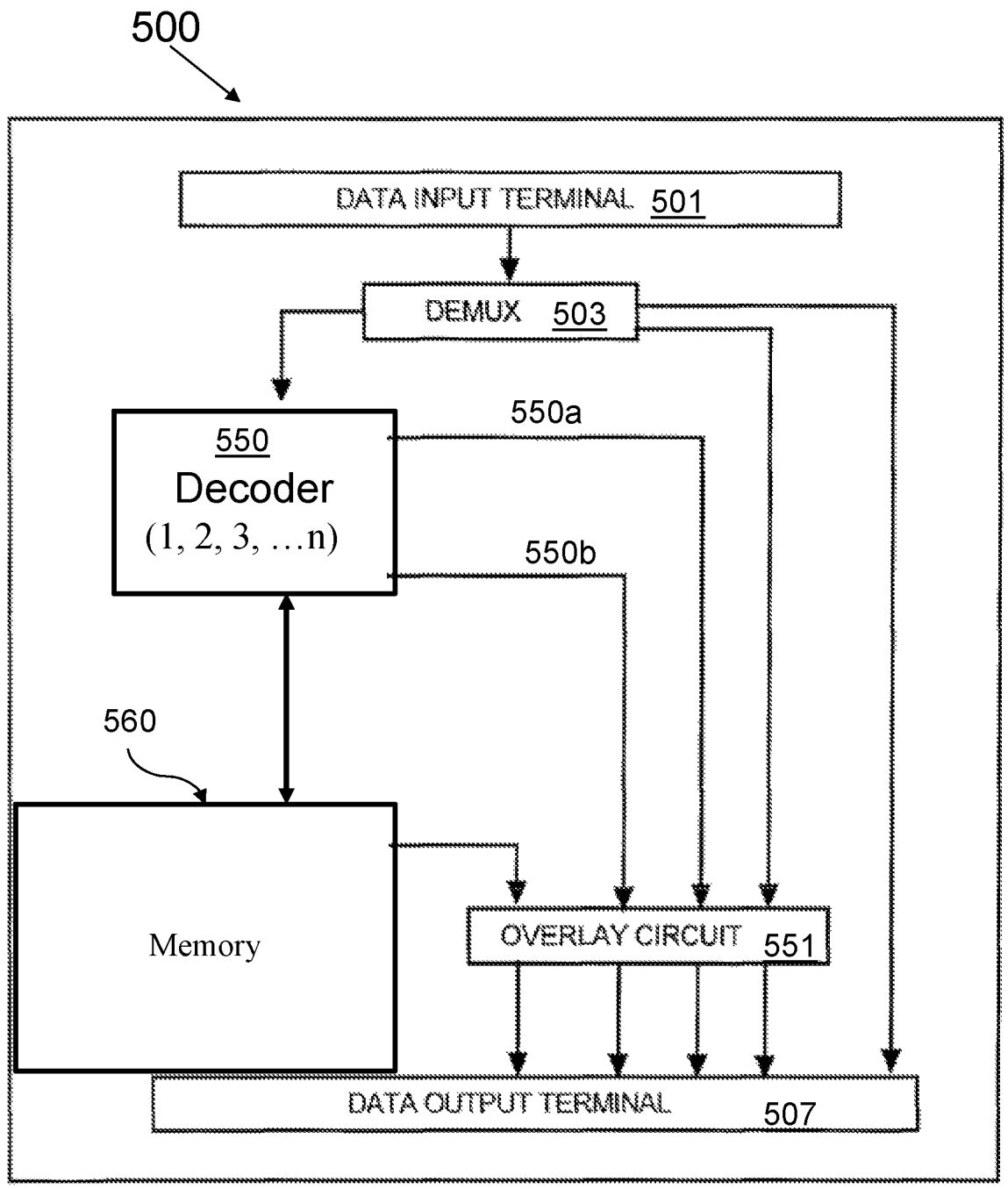
FIG. 7 shows a representative diagram of a decoder unit for execution of the PiP functionality of the subject method and system.

FIG. 7 shows a block diagram of an embodiment of a decoder unit of the subject invention integrated within a STB, as for example 450 in FIG. 6, shown generally at 500. The decoder unit 500 includes a data input terminal 501 that receives one or more program transport streams. The program transport streams are not decoded or transcoded prior to the data input terminal 501. A demux 503 receives the program transport streams via the data input terminal 501. The demux 503 demultiplexes the program transport streams to select one or more program transport streams and provides an output to decoder 550 or directly to data output terminal 507, bypassing decoder 550. Demux 503 may also output control signals to overlay circuit 551 which may be received via data input terminal 501. More than one decoder 550 may be provided in the decoder unit 500 (either functionally, such as using a single decoder chip to decode multiple program streams in a time shifted manner, or using multiple decoder processing units or chips to operate on multiple program streams simultaneously). For example, decoder 1 and a decoder 2 may decode one or more of the selected program transport streams based on the same or different encoding standards as required by the program stream or by the capabilities that the decoder supports. For example, a decoder 1 may decode a program stream 1 based on the MPEG4 (AVC/H.264) standard that the decoder 1 supports and output content 1. Likewise, the decoder 2 may decode a program stream 2 based on the MPEG2 standard or HEVC standard and output content 2. Alternatively, the decoder 550 may be programmed for broad range decoder support functionality.

The decoding unit 500 may optionally include a video input terminal (not shown) and an overlay circuit 551 to format some of the decoded program transport streams to display overlay content in the display device. A control signal, such as an overlay control signal that may be sent from the set-top box to the decoding unit 500.

Decoder unit 500 also includes a data output terminal 507. The data output terminal 507 outputs one or more decoded program transport streams to an external device, such as the display device/TV. The decoding unit 500 is implemented to execute one or more computer programs performing the functions described herein. The computer programs are stored in computer storage mediums, such as Random Access Memory (RAM) in the STB, where software may reside during runtime in a main memory, and a secondary memory may be provided to store program transport streams and decoded program transport streams. Adjustment parameters, including graphics size resolution, display size resolution, and/or user preferences, may be stored in the memory at 560 integrated in the STB unit, and accessed by the decoder 550. It is noted that the decoder unit 500 may be a separate add-on unit to the STB, and in which case the decoder unit 500 may have its own storage medium.

The platform initiates analysis of configuration of the requested PiP display as the decoder 550 decodes stream 2 and content 2 (with stream 1 and content 1 stored in memory for output on the main display screen shown generally at 550a) and performs an adjustment operation (e.g. scaling the image) to provide a PiP inset image based on configurations and parameters retrieved by the decoder 550 from memory 560. Adjustment operation comprises re-sizing the decoded image from requested stream 2 and content 2 for PiP display based on adjustment parameters or graphics size resolution, and/or video display size resolution of stream 2 and content 2 for PiP display to conserve resources applying known bias (video/graphics), shown generally at 550b. Optionally, memory 560 includes stored user preference(s), known bias, i.e. video or graphics resolution, that are also taken into account, so that experience is consistent (i.e. video is always HD for one user). Embodiments of the subject methods in which the decoder unit 500 and STB of FIG. 7 may be employed for decoding a program transport stream of the subject invention are described herein.

Figure 8:
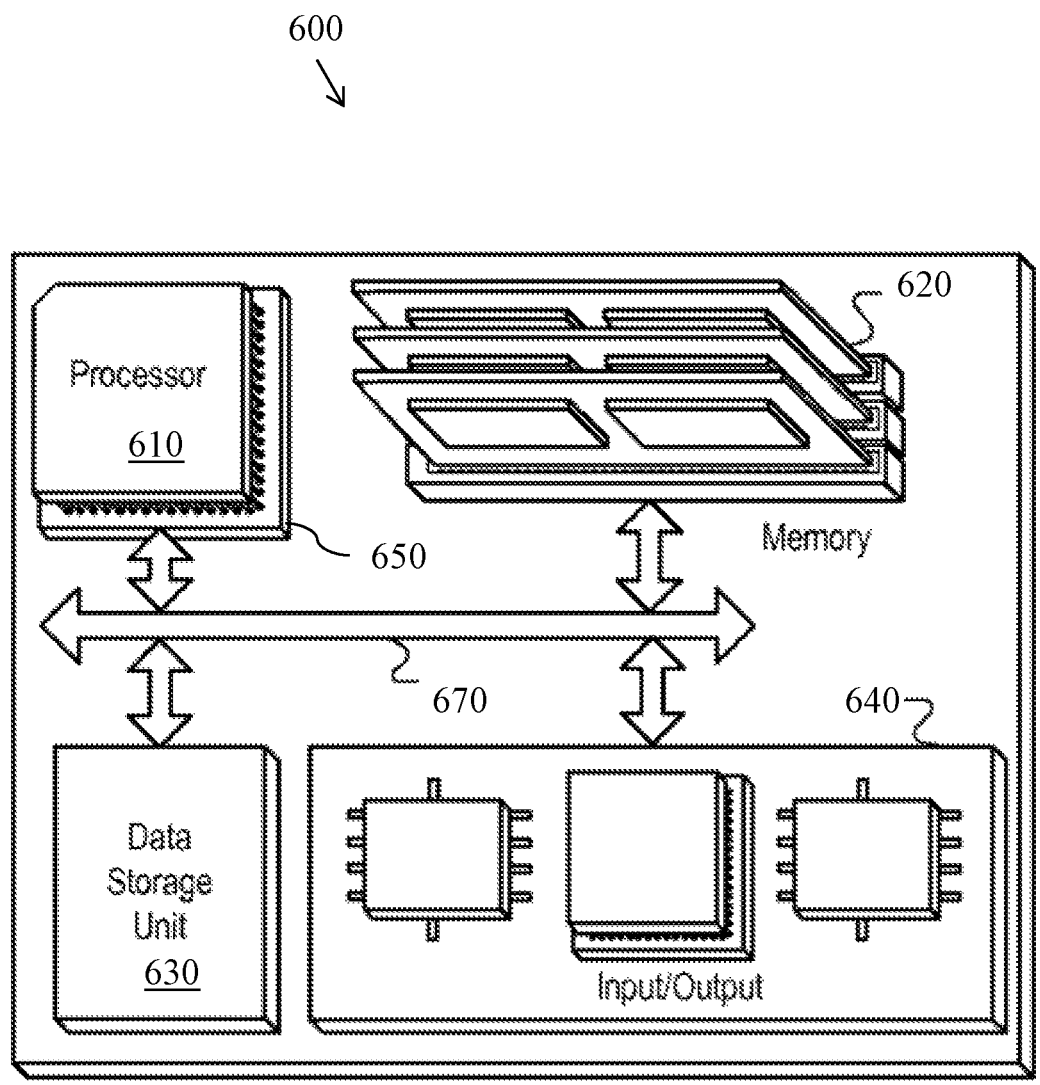
FIG. 8 is a block diagram of a hardware configuration operable to facilitate the initiation of the subject method and system.

FIG. 8 is a block diagram of a hardware configuration operable to facilitate the initiation of the subject method, shown generally at 600. The hardware configuration can include a processor 610, a memory 620, a storage device 630, decoder 650 and an input/output device 640. Each of the components 610, 620, 630, 650 and 640 can, for example, be interconnected using a system bus 670. The processor 610 can be capable of processing instructions for execution of the subject method, system and computer readable media within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630. The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit. In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600. The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., Access point, cable modem, router, wireless extender, or other access device) or subscriber device (e.g, STB, etc.). In another implementation, the input/output device can include driver devices configured to send communications to, and receive communications from one or more networks (e.g., WAN, local network, cloud, headend/cloud controller, etc.).

The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) algorithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for intelligently monitoring, detecting and displaying independent videos on a display comprising:
   receiving a request to display in a second content display window on the display a second content stream simultaneously with a first content stream on the display, said first and second content streams each having input parameters and video input characteristics;
   monitoring currently available resources including memory and bandwidth:
      if available resources are sufficient, allocating available resources to simultaneously display the first and second content streams,
      if available resources are not sufficient, carrying out an adjustment operation that modifies at least one of the input parameters or video input characteristics to simultaneously display the first and second content streams.

2. The method of claim 1, wherein the second content stream's input parameters and video input characteristics undergo the adjustment operation.

3. The method of claim 1, wherein both the first and second content stream's input parameters and video input characteristics undergo the adjustment operation.

4. The method of claim 1, wherein the input parameters include at least one of graphics resolution, frame rate, aspect ratio, display size and display location.

5. The method of claim 1, wherein the first content stream is provided in a first video format and the second content stream is provided in a second video format different from the first video format.

6. The method of claim 1 wherein said request comprises user preferences including known user preferences for video or graphic resolution and the adjustment operation is carried out consistent with the user preferences.

7. The method of claim 1, wherein said adjustment operation further comprises adjustments to at least one of video resolution, bandwidth, memory, decoders and display area.

8. The method of claim 1, wherein the adjustment operation comprises partition of the memory, decoding and adjusting display area between the second content display window's video and graphics.

9. The method of claim 1, wherein the adjustment operation comprises scaling of the second content display window video or graphics to accommodate available memory, adjusting decoder resources and user preferences.

10. A decoding apparatus associated with a STB for monitoring, detecting and displaying independent videos on a display comprising:
   a. at least one decoder for decoding programs in an encoded format;
   b. at least one input that receives at least one encoded program, wherein the decoder decodes the encoded program to yield a first content stream;
   c. at least one output that outputs the first content stream on a display;
   d. a processor configured to: (i) initiate a request to display a second content display window presenting a second content stream simultaneously with the first content stream on the display, said first and second content streams each have input parameters and video input characteristics; monitoring currently available resources including memory and bandwidth: if available resources are sufficient, allocating available resources to simultaneously display the first and second content streams, if available resources are not sufficient, modifying at least one of the input parameters or video input characteristics to simultaneously display the first and second content streams.

11. The apparatus of claim 10, wherein the second content stream's input parameters and video input characteristics undergo the adjustment operation.

12. The apparatus of claim 10, wherein both the first and second content stream's input parameters and video input characteristics undergo the adjustment operation.

13. The apparatus of claim 10, wherein the input parameters include at least one of graphics resolution, frame rate, aspect ratio, display size and display location.

14. The apparatus of claim 10, wherein the first content stream is encoded in a first video format and the second content stream is encoded in a second video format different from the first video format.

15. The apparatus of claim 10 wherein said request comprises user preferences including user preferences for video or graphic resolution and the adjustment operation is carried out consistent with the user preferences.

16. One or more non-transitory computer readable media having instructions operable to cause one or more processors to perform operations which comprise: receiving a request to display a second content display window presenting a second content stream simultaneously with a first content stream on the display, said first and second content streams each having input parameters and video input characteristics; monitoring currently available resources including memory and bandwidth: if available resources are sufficient, allocating available resources to simultaneously display the first and second content streams; if available resources are not sufficient, carrying out an adjustment operation that modifies at least one of the input parameters or video input characteristics to simultaneously display the first and second content streams.

17. The non-transitory computer readable media of claim 16, wherein both the first and second content stream's input parameters and video input characteristics undergo the adjustment operation.

18. The non-transitory computer readable media of claim 16, wherein the input parameters include at least one of graphics resolution, frame rate, aspect ratio, display size and display location.

19. The non-transitory computer readable media of claim 16, wherein the first content stream is provided in a first video format and the second content stream is provided in a second video format different from the first video format.

20. The non-transitory computer readable media of claim 16 wherein the request further comprises user preferences including known user preferences for video or graphic resolution and the adjustment operation is carried out consistent with the user preferences.

* * * * *